United States Patent [19]

Jameson

[11] Patent Number: 4,983,438

[45] Date of Patent: Jan. 8, 1991

[54] MULTI-PLY FORM WITH ATTACHED LABELS AND MULTIPLE FORM PARTS

[75] Inventor: John R. Jameson, St. Charles, Mo.

[73] Assignee: Moore Business Forms, Inc., Grand Island, N.Y.

[21] Appl. No.: 451,932

[22] Filed: Dec. 18, 1989

Related U.S. Application Data

[63] Continuation-in-part of Ser. No. 315,821, Feb. 27, 1989, Pat. No. 4,910,058.

[51] Int. Cl.[5] .................... B32B 7/06

[52] U.S. Cl. .................... 428/42; 428/77; 428/137; 40/299; 40/630; 283/81; 283/101

[58] Field of Search .................... 428/40, 42, 77, 137; 40/299, 630; 283/81, 101

[56] References Cited

U.S. PATENT DOCUMENTS

Re. 30,958 6/1982 White .
3,925,585 12/1975 Aoyagi .
3,993,814 11/1976 Cavender .
4,028,824 6/1977 Miller .
4,032,679 6/1977 Aoyagi .
4,110,502 8/1978 Baer .
4,128,954 12/1978 White .
4,188,250 2/1980 Grass .
4,446,182 5/1984 Cavender .
4,614,361 9/1986 Foster .
4,637,635 1/1987 Levine .
4,700,976 10/1987 Loose .
4,910,058 3/1990 Jameson .................... 428/42

*Primary Examiner*—Alexander S. Thomas
*Attorney, Agent, or Firm*—Nixon & Vanderhye

[57] ABSTRACT

A multi-ply form with labels and multiple form parts is provided, including first and second webs secured one to the other with repositionable adhesive. A plurality of different types of labels are permanently secured to the second web. At least one label of the second web registers with a die-cut portion in the second web and both the one label and die-cut portion register with a die-cut section of the first web. When the webs are separated, the die-cut section is adhered to the second web, enabling removal of the one label therefrom in a manner to provide securment to a surface using either repositionable adhesive or permanent adhesive. Additional holding power may be provided when using the repositionable adhesive by providing a further die-cut segment within the die-cut section of the first web whereby the area of application of the adhesive may be large or small, depending upon whether the die-cut section is removed or not. The first web also includes a second section forming a first form part. A second form part overlies this first form part.

26 Claims, 4 Drawing Sheets

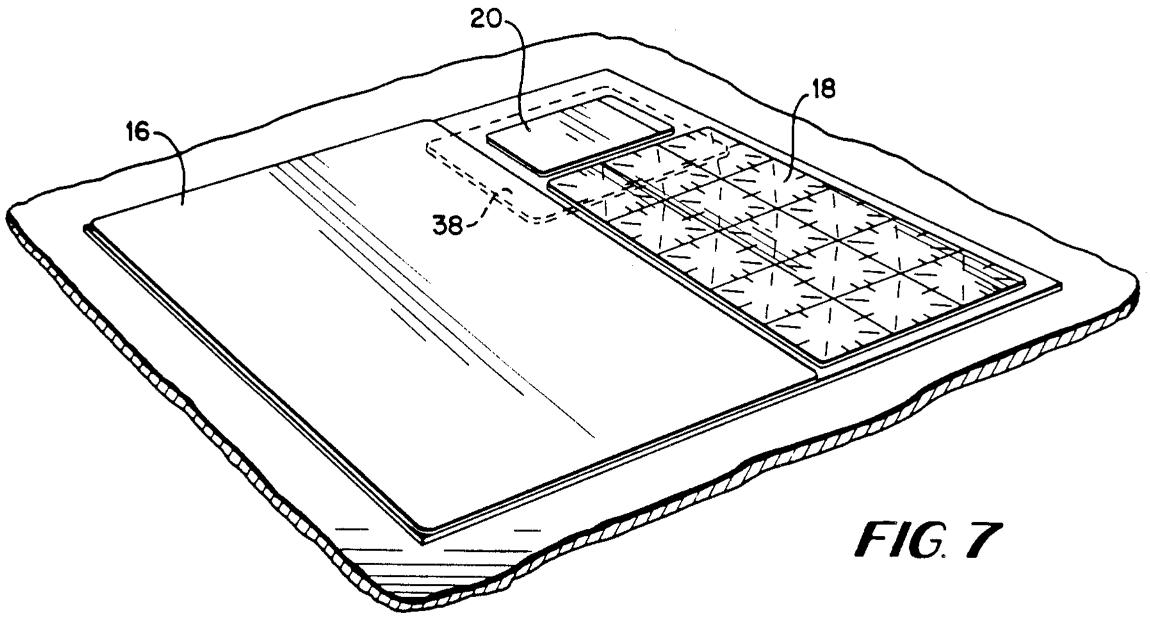
FIG. 7
FIG. 8
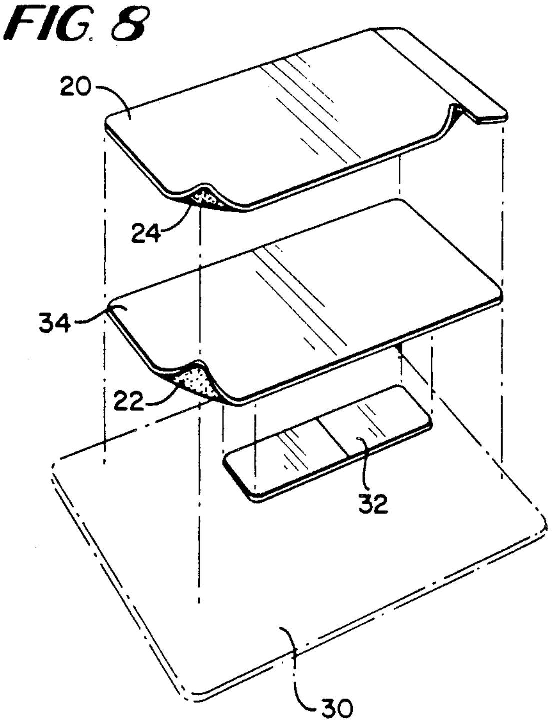
FIG. 9
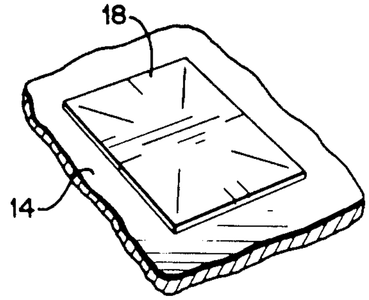

MULTI-PLY FORM WITH ATTACHED LABELS AND MULTIPLE FORM PARTS

RELATED APPLICATIONS

This application is a continuation-in-part of application Ser. No. 07/315,821, filed Feb. 27, 1989, now U.S. Pat. No. 4,910,058 the disclosure of which is incorporated herein by reference.

BACKGROUND AND SUMMARY OF THE INVENTION

The present invention relates to a multi-ply form with labels of different types releasably secured to the plies and more particularly relates to a multi-ply form wherein the labels may be applied using either permanent or repositionable adhesive. The present invention also relates to such form in combination with another multi-form part, for example, a bill of lading.

While the invention hereof has broad applicability, its genesis may best be understood by reference to the wholesaling, distribution and retailing of products. It is frequently desirable at the wholesale or distribution level to provide each container or carton containing products with an identifying label, for example, a pick ticket, together with other labels, for example, pricing labels for the particular products, as well as a bin label. A bin label is applied at the retail establishment to a bin which contains the articles priced according to the price labels. It will be appreciated that the information on the various labels has at least some commonality, e.g., an identification of the product, and that there is a need to ensure that the labels correctly identify and are associated with the particular carton and products contained therein. For example, the pick ticket, price labels and bin label have previously been printed on separate forms necessitating an association of each form with a particular carton. It will be appreciated that, should the pricing labels or bin label become disassociated with that particular carton and another group of pricing or bin labels become associated with that carton, confusion in the labeling of the carton and/or products will naturally result. It is therefore important that all labels associated with a particular product or its container be collated such that those labels do in fact become associated with the appropriate carton upon shipment.

An additional problem resides in the nature of the adhesive used to apply the labels. It is frequently necessary to remove the pick ticket from the carton. If permanent adhesive is used, it oftentimes results in tearing the fiber of the carton. Repositionable adhesive may not have the requisite holding power. It must be borne in mind also that it is desirable to have permanent adhesive on pricing labels and the option of having permanent or removable adhesive on certain of the other labels.

Additionally, in certain situations, it has been found necessary to provide a bill of lading form, for example, a form which will provide an office copy and a packing slip identifying the products being shipped, as part of the identifying label for the container or carton. Separate printing of such form requires its collation with the other product-identifying labels and it has been deemed desirable to design a bill of lading form with a multi-ply form with labels of different types bearing corresponding information for securement to the various surfaces, as needed.

In accordance with one aspect of the present invention, there is provided a single multi-ply form having a pair of form sections, the first section having various types of labels attached thereto, one or more of which may be adhesively secured using either permanent or repositionable adhesive, and the second section including multi-ply form parts. The form is constructed such that the necessary information may be printed on all of the labels and form parts at the same time. Additionally, all of the different types of labels and form parts are carried on the single form, thereby eliminating any need to collate the labels as necessary in order to correspond the labels to the appropriate articles, cartons or the like, to which the labels will be applied or to correlate the form parts with the labels. Additionally, because repositionable adhesive may be employed, the form itself may be applied to and removed from a carton without tearing the fiber of the carton. Concurrently, the labels on the form may be provided with permanent-type or repositionable adhesive.

For purposes of the following description, the present invention will be described in terms of a form having, in one section, a picking ticket having three different types of labels, i.e., a pick ticket, price labels and a bin label and, in another section, multi-ply form parts, e.g.. a bill of lading. The invention herein of course, has application broader than to this specific type of form and the description herein of the present invention with respect to this specific type of form is therefore exemplary only rather than limiting. In accordance with the present invention, first and second carrier webs are provided. A repositionable adhesive is provided between the first and second carrier webs, the first web having first and second side-by-side portions constituting parts of the first and second form sections. With respect to the first section, the various labels, including the pick ticket, price labels and bin label, are affixed to the second web on the side thereof remote from the first web portion by permanent-type adhesive. At least the first web portion is treated to constitute a release paper for the repositionable adhesive such that the first web portion and second web may be separated one from the other. The second web is likewise treated so that the labels with the permanent type of adhesive may be removed therefrom.

With the labels affixed by permanent adhesive on one side of the form, the form may be preprinted with the necessary information, such as the identification of the products, their price and the like. Only one printing is needed. The printing is facilitated by the provision of a marginal feed strip along an outer edge of the first web portion such that the form can be machine-fed through a printer.

The first or base web has a die-cut section in its first portion. This die-cut section is removable from the first web portion with the second web when they are separated one from the other. In the exemplary form hereof, one or more of the labels, for example, the bin label, lies in registration with the die-cut section of the first web portion. Between the bin label and the die-cut section, there is provided a die-cut portion in the second web. The die-cut portion is longitudinally and transversely coextensive with the label and lies within the longitudinal and transverse confines of the registering die-cut section of the first web portion. The die-cut section is secured to the second web about the die-cut portion by the repositionable adhesive. As a result of this construction, when the second web and the first web portion are separated, the die-cut section of the first web portion will adhere to the second web. In this manner, the repositionable adhesive applied to the underside of the second web, excluding the area of the second web to which the die-cut section is adhered, is available to adhere the second web, including all of the labels, to a surface. Thus, the second web is interposed between that surface and the labels with the die-cut section and die-cut portion of the first web portion and the second web, respectively, being interposed between the one label and the surface.

For reasons which will become clear, there is provided a second die-cut segment within the confines of the die-cut section of the first web portion and in registration with the die-cut portion of the second web and the one label. The die-cut segment of the first web portion and the die-cut portion of the second web cooperate to define a margin of the die-cut portion about the die-cut segment. Further, it will be appreciated that the same permanent-type adhesive lies between the bin label and the die-cut portion of the second web as between the other labels and the second web. An end slit is also provided in the one label such that the label can be peeled from the second web and applied to a surface using the permanent adhesive.

With respect to the second section of the form, there is provided a multi-part form comprised of the second portion of the first web and an overlying form part. For consistency of presentation herein, the second portion of the first web will be referred to as the first form part of the two-part multi-ply form constituting the second section of the form. The second form part, which overlies the first form part, is secured to the first form part, preferably adjacent the marginal edge of the form, which also includes a feed strip. Thus, the second form part overlies the first form part and lies next adjacent the second web. In a preferred form, the second form part is not attached to the second web but merely lies to one side of the second web, the securement of the second form part being effected by the securement along its margin to the first form part. The first form part is preferably joined to the first web portion by a line of perforations whereby the second section may be removed from the form by separating the first form part from the first web portion along that line of perforations. For example, where the second section constitutes a bill of lading, the bill of lading may thus be separated from the first form section and the form parts used, for example, for office record-keeping purposes and placement in the carton or box containing the articles identified on the form. Carbonless transfer medium may be applied to the first and second form parts whereby information applied thereto may be reproduced on both form parts.

In using the forms of the present invention, the forms are first fed through a printer where necessary information is preprinted on the labels and form parts. Thereafter, the first carrier web, including the first and second form parts, is removed such that the second carrier web may be releasably adhered by repositionable adhesive to a surface, for example, a carton. It will be appreciated that the die-cut section of the first web portion remains with the second web when the first web portion and second web are separated such that only those areas of the second web outside the die-cut section are releasably secured to the surface. The first form part may be separated from the first web portion along the line of perforations whereby, for example, a bill of lading is provided. The form parts may then be used as desired, for example, as office record copies or placed in a carton with the products. When the carton arrives, for example, at a retail store, the entire second web, including all of the labels, may be removed from the carton. At this time, the pricing labels may also be removed from the second web and applied to the products contained within the carton using the permanent adhesive. In the event the carton is to be saved, the picking ticket may be removed from the second web and applied directly to the carton, using the permanent adhesive.

Depending upon the nature of the surface to which the bin label is to be secured, it is a feature of the present invention that the bin label may be secured with selected different degrees of adhesion using the repositionable adhesive or may be secured using the permanent adhesive. To accomplish this, the bin label may be removed from the die-cut section of the first web, exposing the marginal portions of the bin label bearing the repositionable adhesive and surrounding the die-cut segment. The bin label may thus be secured to a surface using those marginal portions and the repositionable adhesive thereon as the means for securing the label to the surface. It will be appreciated that in this form of securement, the die-cut segment will underlie the bin label, i.e., be interposed between the bin label and the surface to which the bin label is secured. If greater adhesion is required and it is desired to continue to use repositionable adhesive, the die-cut segment of the first web portion may additionally be removed from the bin label. Consequently, the entire undersurface of the second web carrying the repositionable adhesive may be exposed for securing the label to the surface. Because of this larger surface area containing the repositionable adhesive, the bin label will be secured to the surface with greater adhesion or holding power yet still be removable from the surface because of the repositionable nature of the adhesive. If a permanent-type securement is desired, the label may be grasped at the slit line so that the label can be peeled from the second web to expose the permanent-type adhesive on the undersurface of the label, whereby the label may be permanently secured to a surface.

By using the foregoing-described multi-ply arrangement of the two carrier webs, attached labels, and the multi-part form section, it will be appreciated that the printing can be accomplished initially and substantially simultaneously on all of the labels without any subsequent need to collate the labels or correspond them one to the other. Additionally, the repositionable adhesive may be used whereby tearing the fiber of the cartons may be avoided while simultaneously affording a choice between using repositionable or permanent-type adhesive for certain of the labels.

In a preferred embodiment according to the present invention, there is provided a multi-ply form having multiple form parts and labels for removal from the form and adhesion to various surfaces comprising first and second webs, the first web having first and second portions. A repositionable adhesive on said second web releasably secures the second web to the first portion of the first web. Also provided is a plurality of labels, with permanent adhesive carried by the labels releasably securing the labels to the second web on a side thereof remote from the first web portion whereby, upon removal of the first web portion from the second web, the second web and labels carried thereby may be releasably secured to a first surface by the repositionable adhesive, and upon removal of at least one of the labels from the form, the one label may be secured to a second surface. Also provided are first and second superposed form parts with the first form part constituting the second portion of the first web, with means securing the first and second form parts one to the other and means for releasably securing the first form part to the first web portion whereby the second form part is generally co-planar with the second web.

In a further preferred embodiment according to the present invention, there is provided a multi ply form having multiple form parts and labels for removal from the form and adhesion to various surfaces comprising first and second webs, the first web having first and second portions, with an adhesive on the second web releasably securing the second web to the first portion of the first web and at least one of the webs having a marginal feed strip whereby the form may be fed by a machine. Also provided is a plurality of labels, with an adhesive carried by the labels releasably securing the labels to the second web on a side thereof remote from the first web portion. Means are provided to define a die-cut section in the first web portion, a portion of the second web overlying the die-cut section and adhered thereto by the adhesive disposed between the webs whereby, upon removal of the first web portion from the second web, the second web and labels carried thereby may be releasably secured to a first surface by the adhesive, and upon removal of at least one of the labels from the form, the one label may be secured to a second surface, the die-cut section being removable from the first web portion with the second web, whereby the removed die-cut section prevents releasable adhesive securement of the overlying portion of the second web to the first surface when the second web is releasably secured to the first surface. Also provided are first and second superposed form parts with the first form part constituting the second portion of the first web, with means securing the first and second form parts one to the other and means for releasably securing the first form part to the first web portion whereby the second form part is generally co-planar with the second web.

In a still further preferred embodiment according to the present invention, there is provided a multi-ply form carrying multiple form parts and labels comprising first and second webs, the first web having first and second portions, with a repositionable adhesive on the second web releasably securing the second web to the first portion of the web. Also provided is a plurality of labels, with permanent adhesive carried by the labels releasably securing the labels to the second web on a side thereof remote from the first web portion. Additional means define a die-cut section in the first web portion, a portion of the second web overlying the die-cut section and adhered thereto by the repositionable adhesive, the portion of the second web overlying the die-cut section being die cut from the second web to form a die-cut portion, the one label overlying the die-cut portion of the second web, the die-cut portion lying wholly within the margins of the die-cut section whereby the margins define a peripheral area underlying the second web outwardly of the die-cut portion. First and second superposed form parts are provided with the first form part constituting the second portion of the first web, together with means securing the first and second form parts one to the other. Additional means releasably secure the first form part to the first web portion whereby the second form part is generally co-planar with the second web.

Accordingly, it is a primary object of the present invention to provide a novel and improved multi-ply form for carrying labels and separable multi-ply form parts wherein one or more of the labels may be applied to a surface using permanent or repositionable adhesive and the form parts may be removed for record-keeping purposes.

These and further objects and advantages of the present invention will become more apparent upon reference to the following specification, appended claims and drawings.

BRIEF DESCRIPTION OF THE DRAWING FIGURES

Figure 2:
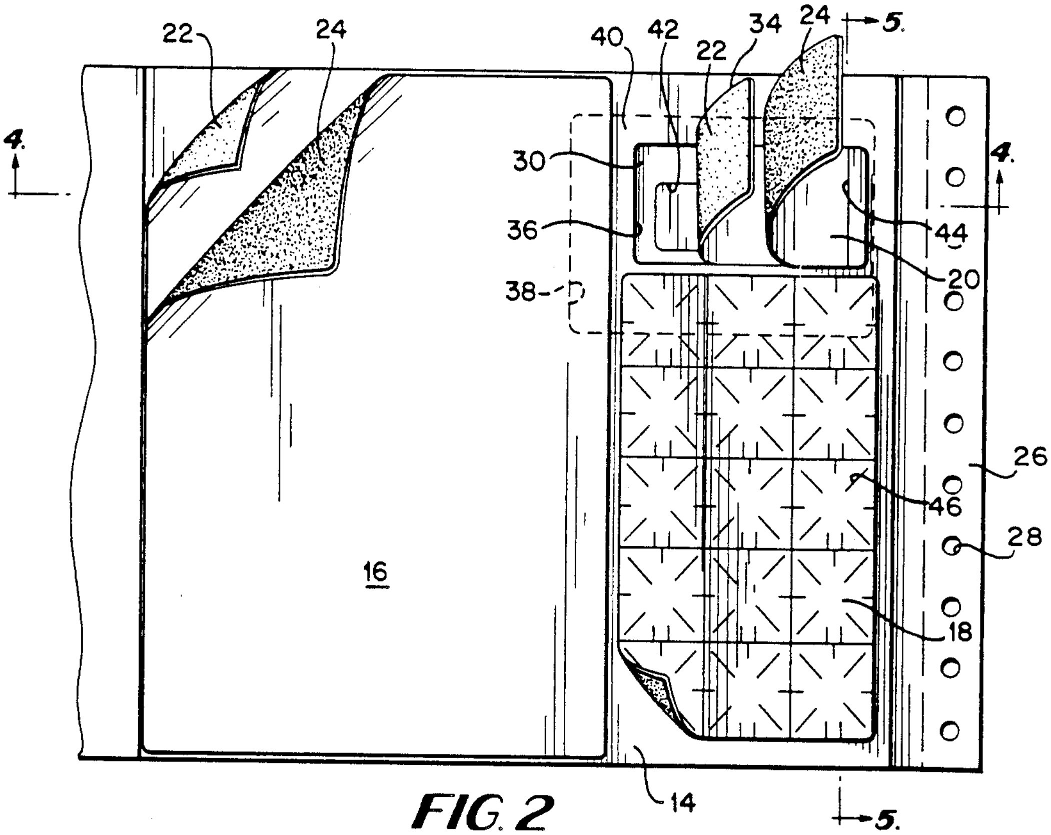
FIG. 2 is a plan view of the form illustrated in FIG. 1, principally the first form section thereof, label side up, with certain of the plies and labels being partially peeled back to illustrate their removability and the type of adhesive.
Figure 3:
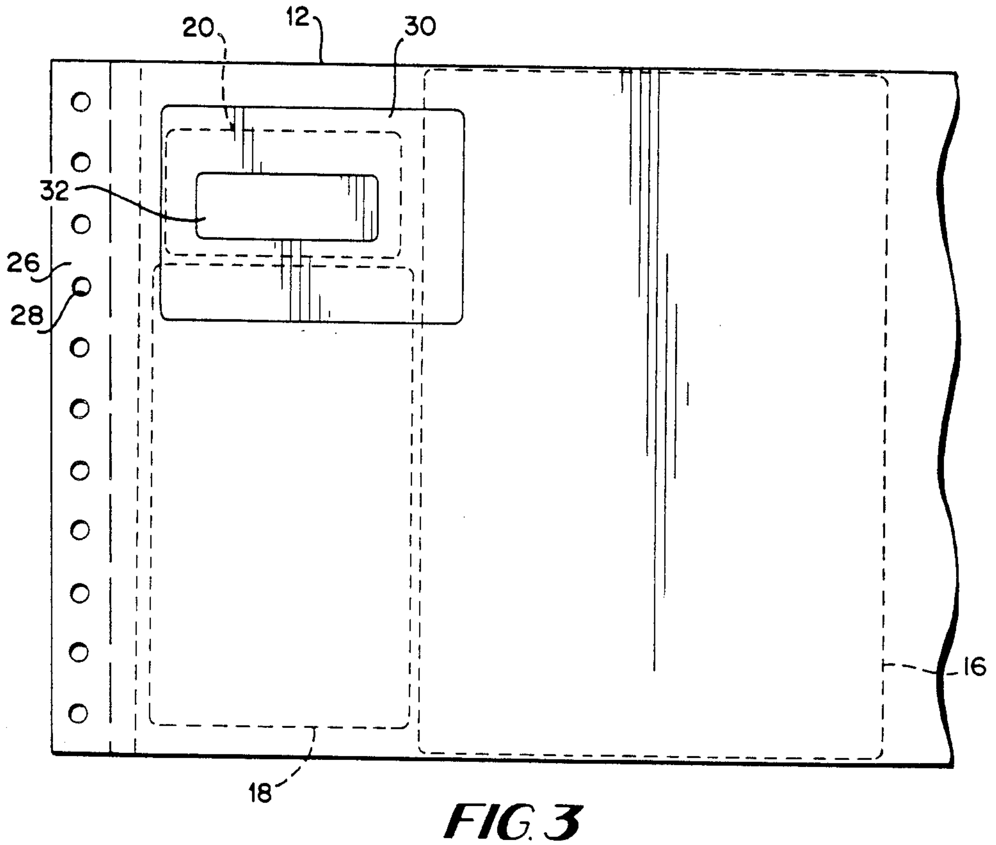
FIG. 3 is a view similar to FIG. 2, looking from the reverse side of the form and illustrating a die-cut section of the first web portion.
Figure 4:
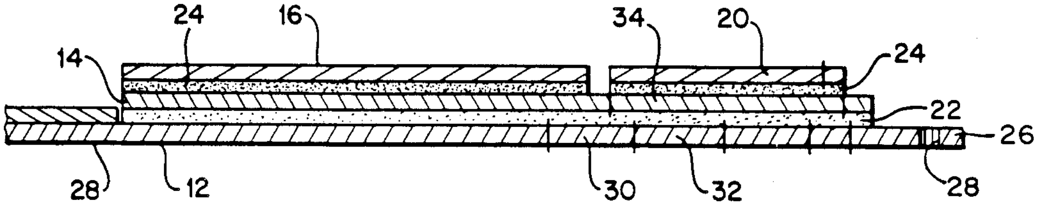
Figure 5:
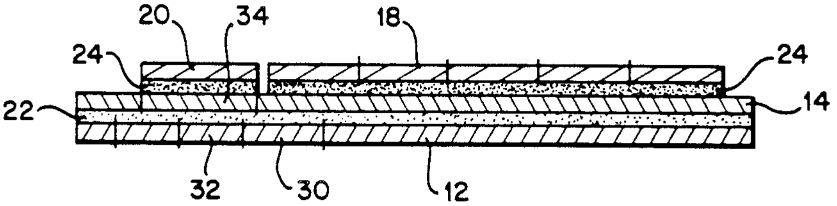
Figure 6:
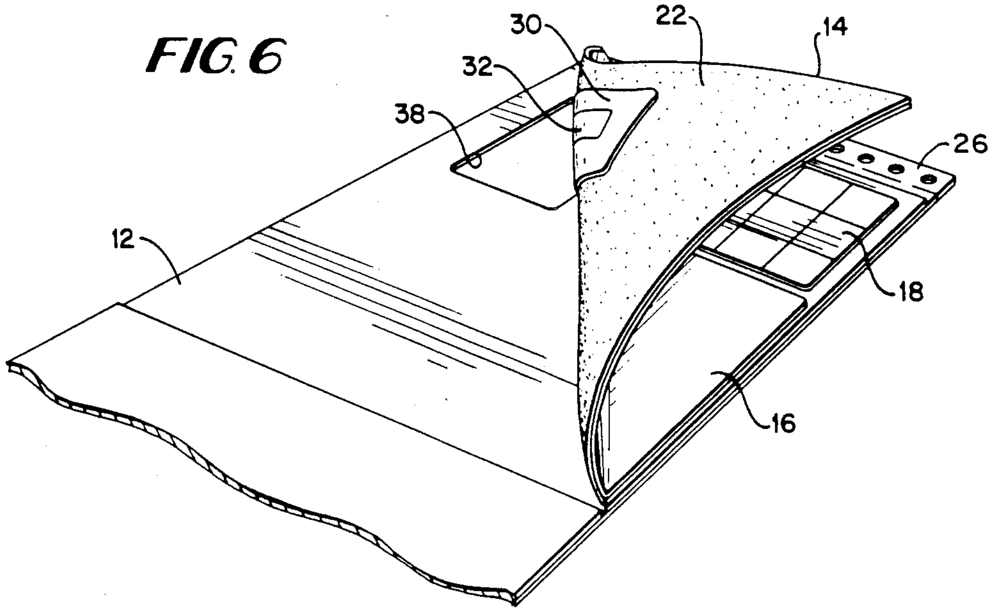

FIGS. 4 and 5 are cross-sectional views of the form hereof taken generally about on lines 4—4 and 5—5 in FIG. 2;

FIG. 6 is a perspective view illustrating the manner of separating the first web portion and the second web of the form hereof with the die-cut section remaining with the second web upon separation thereof;

FIG. 7 is a perspective view illustrating the front or label side of the form;

FIG. 8 is an exploded perspective view illustrating the manner of securement of the bin label in the form; and FIG. 9 is an enlarged perspective view illustrating the attachment of a pricing label to the second web.

DETAILED DESCRIPTION OF THE DRAWING FIGURES

Reference will now be made in detail to the present preferred embodiment of the invention, an example of which is illustrated in the accompanying drawings.

Figure 1:
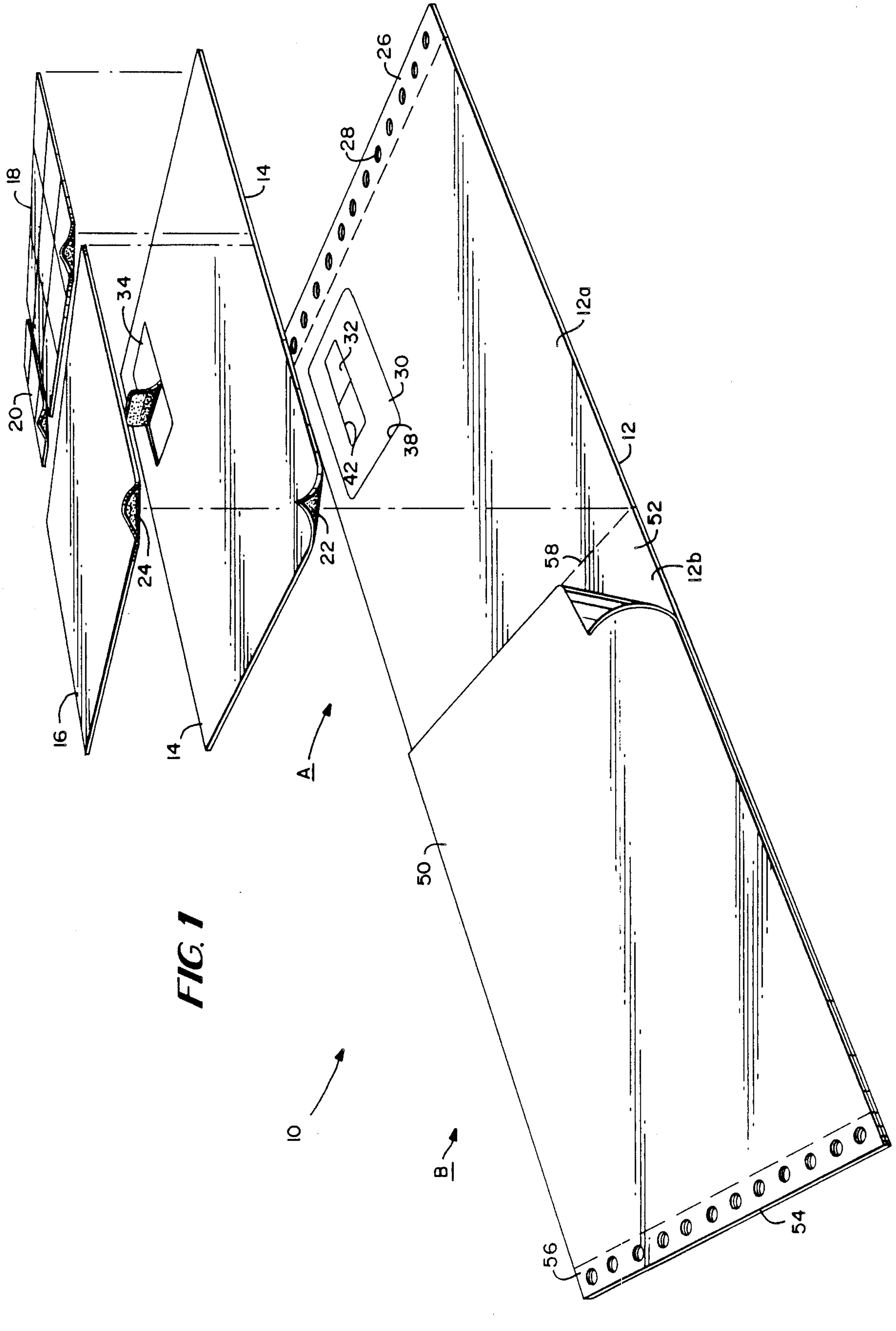
FIG. 1 is an exploded perspective view of an exemplary multi-ply form with labels and multi-ply form parts constructed in accordance with the present invention.

Referring now to the drawings, particularly to FIG. 1, there is illustrated a multi-ply form, generally designated 10, constructed in accordance with the present invention, and comprising first and second form sections, generally designated A and B. Form 10 includes a first or base carrier 12 forming part of both sections A and B. For ease of description, the first form section will be described including the labels and then the second form section including the multi-ply form parts will be described. The first form section A includes first web portion 12*a* and a second carrier web 14. Various labels are illustrated in FIG. 1 and, for purposes of this exemplary description, are identified as a pick ticket label 16, pricing labels 18 and a bin label 20. As best illustrated in FIGS. 2 and 7, the pricing labels 18 are provided in longitudinal and transversely extending rows thereof, fifteen price labels being illustrated in five transversely extending rows of three price labels each. Of course, only a single bin label 20 and picking label 16 are disclosed, although plural labels of one or both types may be provided.

The first web portion 12*a* and second web 14 are releasably secured one to the other by a repositionable adhesive 22 disposed on the underside of second web 14. It will be appreciated that the opposing surface of web portion 12*a* is treated such that the two webs may be releasably secured one to the other, with the repositionable adhesive 22 adhering to the second web 14. The undersides of the labels 16, 18 and 20 are provided with a permanent-type adhesive denoted 24. The corresponding surface of the second web 14 is likewise appropriately treated such that the labels with the permanent adhesive may be removed from the web 14 and applied permanently to a surface using the permanent adhesive. As best illustrated in FIG. 1, the first web portion 12*a* has a marginal feed strip 26 extending along one side thereof, the strip 26 having a plurality of longitudinally spaced openings 28 whereby the form may be fed through business machines for printing purposes.

Referring now to FIGS. 1 and 8, a portion of the web portion 12*a* is die-cut to define a removable die-cut section 30. Consequently, it will be appreciated that, when the web portion 12*a* and second web 14 are releasably secured one to the other by the repositionable adhesive 22, separation thereof will enable the die-cut section 30 of web portion 12*a* to be removed therefrom and remain adhered to the underside of web 14, for example, as illustrated in FIG. 6. For reasons which will become clear, there is an additional die-cut segment 32 formed within the confines of the die-cut section 30. Die-cut segment 32 is in the form of a pair of adjacent rectangular die-cut panels. Similarly as die-cut section 30, die-cut segment 32 is removable with the web 14 when the web portion 12*a* and second web 14 are separated one from the other.

Referring now to FIGS. 1 and 2, the second web 14 also has a die-cut portion 34 which is larger than the die-cut segment 32 but smaller than the die-cut section 30 in first web 12. Die-cut portion 34, however, is coextensive with the bin label 20. Thus, it will be apparent that the label 20, die-cut section 34 and at least parts of the die-cut segment 32 and die-cut section 30 lie in registration one with the other.

As best seen in FIG. 2, it will be appreciated that the edge 36 defining the die-cut portion 34 of second web 14 defines with the edge 38 of the die-cut section 30 in web 12 a marginal portion 40 of the second web 14. This marginal portion 40, of course, has the repositionable adhesive 22 along its underside whereby the die-cut section 30 is maintained in place secured to web 14 in the assemblage of the multi-ply form hereof. Similarly, the edge 42 defining the die-cut segment 32 in web 12 is inset from and surrounded by the edge 36 defining the die-cut portion 34. Therefore, the repositionable adhesive 24 on the underside of die-cut portion 34 contacts both the die-cut segment 32 and the die-cut portion 30 of web portion 12*a* and secures them in the form assemblage. Moreover, the label 20 and die-cut portion 34 (secured one to the other by permanent adhesive 24) are secured in place in the form assemblage by the repositionable adhesive 22 on the underside of die-cut portion 34 which adheres to the die-cut section 30, the latter, in turn, being held in the assemblage by the repositionable adhesive along the underside of the margin 40 of the second web 14. A slit 44 is formed along one side of bin label 20. Slit 44 enables the corner of label 20 to be peeled back from the die-cut portion 34, exposing the permanent adhesive 24, whereby the label 20 may be permanently secured to a surface. The configuration of the price labels 18 is per se conventional. Each label 18 has a number of slits 46 disposed therein which conventionally are provided as an anti-theft measure to preclude removal of the price label without tearing the label.

Referring back to FIG. 1, the second form section B comprises multi-ply form parts which, for example, may in use constitute a bill of lading. Form section B, as illustrated in FIG. 1, includes a web portion 12*b* forming a part of the first web 12 and constituting a first form part of the multi-ply form parts of form section B. Overlying web portion 12*b* is a second form part 50. Preferably, a carbonless transfer mechanism, such as described and illustrated in U.S. Pat. No. 4,199,174, issued Apr. 22, 1980, of common assignee herewith, may be used such that information recorded on the overlying form part 50 may be transferred to the underlying second form part 52. Form part 50 is secured to the underlying form part 52 by a pair of marginal feed strips 54 and 56 connected, respectively, by perforation lines to the form parts 52 and 50, respectively. The marginal feed strips 54 and 56 may be adhesively secured one to the other. Alternatively, the overlying form part 50 may be secured to the underlying form part 52 by other means, such as adhesive along the margins of the forms or mechanical crimps or the like. A line of perforations 58 is provided between the web portions 12*a* and 12*b*. Preferably, however, the end of the form part 50 adjacent form section A remains free and unattached to any other part of the form.

To use the multi-ply form with attached labels hereof, the form is first disposed in a printer such that the necessary information may be preprinted on each of the labels 16, 18 and 20 and also in the form parts 50 and 52. When removed from the printer, the first and second web portions 12*a* and 12*b* may be separated along the line of perforations 58 whereby form sections A and B are separated. Form parts 50 and 52 may then be separated and maintained as record copies. Alternatively, one form part may be maintained as an office copy and the other placed in the carton to which the form section A will be attached. More particularly, first web portion 12*a* of form 10 may be removed from the second web 14, exposing the repositionable adhesive 22 surrounding the die-cut section 30 on web 14, whereby the web 14, including the labels and die-cut section 30, as well as die-cut segment 32, may be secured to a surface. That is, when the webs are separated, the die-cut section 30 and die-cut segment 32 remain with the web 14 in underlying registration with die-cut portion 34 and bin label 20. Once the web 14 is applied to a surface, for example, to a carton, the carton may be shipped, for example, to a retailer. At the retail establishment, if one of the form parts 50 or 52 is placed in the carton, the information on that form part may be checked against the contents of the carton. Also, the entire form, including web 14 and the labels, may be removed from the carton without tearing the fibers of the carton because of the nature of the repositionable adhesive. The pricing labels may then be removed from the web 14 and applied individually to the products contained within the carton. If the carton is to be saved, for example, as a storage container for the products remaining in the carton, the pick ticket 16 may be removed from web 14 and applied directly to the carton, using the permanent adhesive 24. Alternatively, of course, the web 14 may be retained on the carton, using the repositionable adhesive 22 and the labels 18 and 20 removed from the form retained on the carton.

Where the surface of the bin is such that the bin label may be secured thereto with very little repositionable adhesive or where there is a necessity to subsequently relocate the bin label to another bin, the label 20, including the die-cut portion 34 and the die-cut segment 32 may be removed from the die-cut section 30. The latter, it will be recalled, is secured to the underside of web 14 by the repositionable adhesive 22 along the margin 40. When the label is thus removed, it will be appreciated that the die-cut segment 32 is retained by the repositionable adhesive 22 on the underside of die-cut portion 34 and that the margin of the die-cut portion 34 containing the repositionable adhesive about die-cut segment 32 is exposed whereby the label may be releasably secured to a surface, e.g., the bin. If greater holding power is required, die-cut segment 32 may be removed from the underside of the die-cut portion 34, exposing the entirety of the repositionable adhesive along the underside of die-cut portion 34. Thus, the label may be releasably secured to a surface using the entirety of the repositionable adhesive along the underside of die-cut portion 34. If, however, a more permanent type securement is necessary, the bin label 20 may be peeled back along slit 44 and removed from the die-cut portion 34, exposing the permanent adhesive along the underside of label 20. In this manner, the label may be permanently secured to a surface.

Thus, it will be appreciated that at least one of the labels of the form may be secured to a surface using repositionable adhesive with two degrees of adhesion or may be permanently secured to a surface using a permanent type adhesive. Also, the forms may be preprinted in a single pass in a printing machine and secured to a surface without danger of tearing or otherwise damaging the surface, particularly if the surface is formed of a cardboard-type material.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A multi-ply form having multiple form parts and labels for removal from the form and adhesion to various surfaces comprising:

first and second webs, said first web having first and second portions;

a repositionable adhesive on said second web releasably securing said second web to the first portion of said first web;

a plurality of labels;

permanent adhesive carried by said labels releasably securing said labels to said second web on a side thereof remote from said first web portion;

whereby, upon removal of said first web portion from said second web, said second web and labels carried thereby may be releasably secured to a first surface by said repositionable adhesive, and upon removal of at least one of said labels from said form, said one label may be secured to a second surface;

first and second superposed form parts with said first form part constituting said second portion of said first web;

means securing said first and second form parts one to the other; and means for releasably securing said first form part to said first web portion whereby said second form part is generally co-planar with said second web.

2. A form according to claim 1 wherein said labels are of different sizes.

3. A form according to claim 1 wherein said first web has a marginal feed strip outwardly of a margin of said second web whereby the form may be fed by a machine.

4. A form according to claim 1 including means defining a die-cut section in said first web portion, a portion of said second web overlying said die-cut section and adhered thereto by said repositionable adhesive, said die-cut section being removable from said first web portion with said second web, whereby the removed die-cut section prevents adhesive securement of the overlying portion of said second web to the first surface when the second web is releasably secured to the first surface.

5. A form according to claim 4 wherein the portion of said second web overlying said die-cut section is die cut from said second web to form a die-cut portion, said one label overlying said die-cut portion of said second web, said one label and said die-cut portion on the one hand and said die-cut section on the other hand being separable to expose repositionable adhesive on said die-cut portion to enable securement of said one label to a surface, using the repositionable adhesive exposed on said die-cut portion to adhere the one label to the surface.

6. A form according to claim 5 including means for selectively adjusting the area of said die-cut portion on which the repositionable adhesive is exposed for securing the one label to the surface.

7. A form according to claim 5 wherein said die-cut section includes a die-cut segment, said one label and said die-cut portion of said second web lying in registration with at least part of both of said die-cut section and said die-cut segment whereby said one label, said die-cut portion, and said die-cut segment on the one hand and the die-cut section on the other hand being separable to expose only a portion of the repositionable adhesive on said die-cut portion for adhesively securing said one label to a surface.

8. A form according to claim 7 wherein said die-cut segment lies wholly within the confines of said die-cut portion whereby, when said one label, said die-cut portion, and said die-cut segment on the one hand and said die-cut section on the other hand are separated, said die-cut portion and said die-cut segment define a margin of said die-cut portion about said die-cut segment in which said repositionable adhesive is exposed for securing said one label to a surface.

9. A form according to claim 7 wherein said die-cut segment and said die cut portion are separable one from the other to expose an additional portion of the repositionable adhesive on said die-cut portion to secure said one label to a surface.

10. A form according to claim 5 wherein said die-cut portion lies wholly within the confines of said die-cut section.

11. A form according to claim 10 wherein said die-cut section is retained in said form substantially solely by adherence to said second web using said repositionable adhesive on said second web, said die-cut portion and said one label being retained in said form substantially solely by adherence to said die-cut section using said repositionable adhesive on the die-cut portion of said second web.

12. A form according to claim 7 wherein said one label and said die-cut portion are separable one from the other to expose the permanent adhesive on said one label thereby to enable said one label to be permanently adhesively secured to a surface.

13. A form according to claim 7 wherein said die-cut segment lies wholly within the margins of said die-cut section and at least partly within the margins of said die-cut portion to define marginal areas of said die-cut portion containing said repositionable adhesive for releasably securing said one label to a surface.

14. A form according to claim 1 including marginal feed strips along opposite sides of said form, with one of said feed strips extending along an outer margin of said first form part and another of said feed strips extending along an outer margin of said first web portion remote from said first form part.

15. A multi-ply form having multiple form parts and labels for removal from the form and adhesion to various surfaces comprising:

first and second webs, said first web having first and second portions;

an adhesive on said second web releasably securing said second web to the first portion of said first web;

at least one of said webs having a marginal feed strip whereby the form may be fed by a machine;

a plurality of labels;

an adhesive carried by said labels releasably securing said labels to said second web on a side thereof remote from said first web portion;

means defining a die-cut section in said first web portion, a portion of said second web overlying said die-cut section and adhered thereto by the adhesive disposed between said webs whereby, upon removal of said first web portion from said second web, said second web and labels carried thereby may be releasably secured to a first surface by said adhesive, and upon removal of at least one of said labels from said form, said one label may be secured to a second surface, said die-cut section being removable from said first web portion with said second web, whereby the removed die-cut section prevents releasable adhesive securement of the overlying portion of said second web to the first surface when the second web is releasably secured to the first surface;

first and second superposed form parts with said first form part constituting said second portion of said first web;

means securing said first and second form parts one to the other; and means for releasably securing said first form part to said first web portion whereby said second form part is generally co-planar with said second web.

16. A form according to claim 15 wherein the portion of said second web overlying said die-cut section is die cut from said second web to form a die-cut portion, said one label overlying said die-cut portion of said second web, said one label and said die-cut portion on the one hand and said die-cut section on the other hand being separable to expose repositionable adhesive on said die-cut portion to enable securement of said one label to a surface, using the adhesive on said die-cut portion to adhere the one label to the surface.

17. A form according to claim 16 including means for selectively adjusting the area of said die-cut portion on which the adhesive is exposed for securing the one label to the surface.

18. A form according to claim 16 wherein said die-cut section includes a die-cut segment, said one label and said die-cut portion of said second web lying in registration with at least part of both of said die-cut section and said die-cut segment whereby said one label, said die-cut portion, and said die-cut segment on the one hand and the die cut section on the other hand are separable to expose only a portion of the adhesive on said die-cut portion for adhesively securing said one label to a surface.

19. A form according to claim 18 wherein said die-cut segment lies wholly within the confines of said die-cut portion whereby, when said one label, said die-cut portion, and said die-cut segment on the one hand and said die-cut section on the other hand are separated, said die-cut portion and said die-cut segment define a margin of said die-cut portion about said die-cut segment in which said adhesive is exposed for securing said one label to a surface.

20. A form according to claim 18 wherein said die-cut segment and said die-cut portion are separable one from the other to expose an additional portion of the adhesive on said die-cut portion to secure said one label to a surface.

21. A form according to claim 16 wherein said die-cut portion lies wholly within the confines of said die-cut section.

22. A form according to claim 21 wherein said die-cut section is retained in said form substantially solely by adherence to said second web using said adhesive on said second web, said die-cut portion and said one label being retained in said form substantially solely by adherence to said die-cut section using said adhesive on the die-cut portion of said second web.

23. A form according to claim 18 wherein said one label and said die-cut portion are separable one from the other to expose the adhesive carried thereby to enable said one label to be adhesively secured to a surface.

24. A form according to claim 15 including marginal feed strips along opposite sides of said form, with one of said feed strips extending along an outer margin of said first form part and another of said feed strips extending along an outer margin of said first web portion remote from said first form part.

25. A multi-ply form carrying multiple form parts and labels comprising:

first and second webs, said first web having first and second portions;

a repositionable adhesive on said second web releasably securing said second web to the first portion of said web;

a plurality of labels;

permanent adhesive carried by said labels releasably securing said labels to said second web on a side thereof remote from said first web portion; and means defining a die-cut section in said first web portion, a portion of said second web overlying said die-cut section and adhered thereto by said repositionable adhesive, the portion of said second web overlying said die-cut section being die cut from said second web to form a die-cut portion, said one label overlying said die-cut portion of said second web, said die-cut portion lying wholly within the margins of said die-cut section whereby said margins define a peripheral area underlying said second web outwardly of said die-cut portion;

first and second superposed form parts with said first form part constituting said second portion of said first web;

means securing said first and second form parts one to the other; and means for releasably securing said first form part to said first web portion whereby said second form part is generally co-planar with said second web.

26. A form according to claim 25 including marginal feed strips along opposite sides of said form, with one of said feed strips extending along an outer margin of said first form part and another of said feed strips extending along an outer margin of said first web remote from said first form part.

* * * * *